Patented Jan. 1, 1929.

1,697,260

UNITED STATES PATENT OFFICE.

BRUCE M. CLOUD, OF MONTPELIER, INDIANA.

METHOD AND MEANS FOR RECOVERING OIL.

No Drawing.     Application filed March 7, 1927. Serial No. 173,609.

Under the usual practice of recovering oil from the oil containing sands and rock beds of oil fields it is well recognized that a large percentage of the oil remains in the sand and rock formations. Various attempts have been made heretofore to recover this oil, or such proportion of it as possible, and a variety of methods have been devised and used for such purpose. For example, the method known in the industry as "water drive", has been employed. This consists in filling the wells after exhausted to the unproductive stage with water, which operates by hydrostatic pressure to force part of the oil remaining in the sand and rock into adjacent operative wells from which it is pumped with the oil from such adjacent wells.

Another process is that which employs air pressure in the unproductive "exhausted" wells, which operates in a similar manner as the water pressure to force oil remaining in the sand and rock surrounding the unproductive wells to the adjacent wells. In some instances where natural gas is available it has been substituted and used in the place of air. All these methods, however, have fallen far short of obtaining a complete recovery of the oil content in the oil containing sands and rocks.

It is well known that no chemical reaction results from the combination of water and hydrocarbons, gas or oil, and also that no chemical reaction results from the combination of oil and air. The above described processes depend for results, therefore, solely upon hydrostatic or pneumatic pressure following the introduction of the water, or the air, according to which process is employed.

It is commonly acknowledged that by the usual methods employed for recovering oil from oil fields only 20% or thereabouts, of the total oil content is recovered from the oil containing sand and rocks, and further that as a result of the use of the water drive method, or air pressure method, only an additional 15% to 20% of the oil is recovered, leaving substantially 60% of the oil contained in the rocks and sand commonly supposed to be unrecoverable.

My invention relates to an improved method and means for recovering this heretofore supposed to be unrecoverable oil content from the oil containing rocks and sands and it consists in forcing into wells, which have become unprofitable to operate by present known methods, a gas having the property of combining with the oil and producing a chemical reaction that results in reducing the viscosity and increasing the vapor tension of the remaining oil and freeing it so that it will readily flow through the interstices in the rock and sand to the adjacent producing wells under the pressure of the gas and the suction created by the pumps attached to said wells and thus be recovered in a very much larger degree than by any method heretofore known.

The chief elements in this gas are: carbon monoxide, hydrogen and acetylene. The carbon monoxide and hydrogen are produced and combined substanatially as in the manufacture of what is commonly termed "water gas", to which I preferably add about 15% to 30% of acetylene, according to the particular conditions encountered in the field where the operation is being carried on.

The combination of these gases and results obtained should vary in proportions to suit conditions in different localities, either adding to or reducing the proportion of acetylene, governed chiefly by the condition and gravity of the oil in the particular field.

In some fields a certain quantity of natural gas is found in the rock and sands of exhausted wells. This may be used as a part of the volume of gas required in the operation of my process by combining the same with a sufficient quantity of the carbon monoxide and acetylene mixture to provide the necessary volume for the operation. In such case, I wish, of course, to avail myself of the use of this natural gas for such purpose and want it understood that it can be done without any departure from my invention. Natural gas as found in oil producing rock and sand formations does not, as is well known, produce any chemical reaction in combination with hydro-carbons, it being of the same physical and chemical character.

In practicing my invention the gas above described is forced into the unproductive wells in substantially the same manner as has been heretofore employed in the use of air. Said gas operates to absorb, dilute and liberate the oil and carry it to an adjacent producing well from which it is recovered, as before described. The free gas at the producing wells is returned through appropriate pipes from the producing to the non-producing wells, so that the gas not combined with the oil is used repeatedly, such additions being made as may be needed because of the waste or absorption taking place during the practice of the process.

By this process, and the means employed in the practice of the process, I not only succeed in recovering a very large percent of the oil remaining in the oil containing sands and rock heretofore believed unrecoverable and thus add materially to the productiveness and consequent value of oil fields including many that have been commonly regarded as "exhausted", but I am enabled to accomplish another advantage and very valuable result in that by the use of this gas, gasoline vapors and hydrocarbons producing casing-head gasoline, which have remained in considerable quantities in exhausted oil fields not recoverable by any known method may be recovered and converted to valuable uses to which they are adapted. One of the advantages claimed for this gas is the superiority to any other element is the fact that it prevents any channeling and thereby produces a more even distribution of the gases through the sand and rock formations, making it possible to get larger recovery.

It will be obvious to those skilled in the art that various changes may be made in my process without departing from the spirit of my invention, and I, therefore, do not limit my invention except as set forth in the appended claims.

Having thus fully described my said invention, what I claim as new and desire to secure by Letters Patent, is:

1. The method of recovering hydro-carbons from natural hydro-carbon containing rock and sand which consists in introducing therein a gas comprising carbon monoxide and hydrogen with which has been combined a proportion of acetylene gas, substantially as set forth.

2. The method of recovering hydro-carbons from natural hydro-carbon containing rock and sand which consists in introducing into the wells water gas combined with a quantity of acetylene, substantially set forth.

3. The method of recovering hydro-carbons from hydro-carbon containing rock and sand which consists in introducing therein a gas comprising carbon monoxide and hydrogen, substantially as set forth.

4. The method of recovering hydro-carbons from natural hydro-carbon containing rock and sand which consists in introducing water gas into the wells, substantially as set forth.

In witness whereof, I have hereunto set my hand at Indianapolis, Indiana, this 28th day of February, A. D. nineteen hundred and twenty-seven.

BRUCE M. CLOUD.